July 1, 1924.                                                          1,499,880
R. W. SCHUETTE
FLEXIBLE COUPLING
Filed Aug. 12, 1922

INVENTOR
Robert W. Schuette,
BY
Edward A. Lawrence
his ATTORNEY

Patented July 1, 1924.

1,499,880

UNITED STATES PATENT OFFICE.

ROBERT W. SCHUETTE, OF MUNHALL BOROUGH, PENNSYLVANIA.

FLEXIBLE COUPLING.

Application filed August 12, 1922. Serial No. 581,393.

*To all whom it may concern:*

Be it known that I, ROBERT W. SCHUETTE, a citizen of the United States, and residing in the borough of Munhall, in the county of Allegheny and State of Pennsylvania, have invented or discovered the new, useful, and Improved Flexible Coupling, of which the following is a specification.

My invention consists in a new and improved flexible coupling for shafting and the like.

The object which I have in view is the provision of a coupling constructed of nonelastic material, capable of permitting both parallel and angular misalinement, and also axial movement of the shaft ends relative to each other.

A further object which I have in view is the provision of a flexible coupling which permits assemblage or disassemblage of the shafts without requiring their endwise movement.

For the accomplishment of these and other purposes, I have invented a coupling having the following characteristics. I provide a pair of loose flanges which are detachably connected together face to face, and which are each provided with a diametrically disposed and preferably slotted opening whose side walls provide a pair of parallel, opposed sliding bearing surfaces, the flanges being so assembled that the bearing surfaces of one flange are disposed at right angles with the bearing surfaces of the other flange. Each of the shaft ends, or other elements which are to be flexibly coupled together, is provided with a pair of parallel bearing surfaces which are inserted into the opening of the adjacent flange and mate in surface contact with the bearing surfaces of the latter. Sufficient clearance is provided at the ends of the openings of the flanges to allow of sliding and swiveling movement between the mating bearing surfaces, and there is also sufficient clearance provided between the shaft ends to permit such swiveling movement, and, also to permit axial movement of the shaft ends relative to each other.

The rotary motion is transmitted from the driving shaft end to its associated flange by means of their mating bearing surfaces; from said flange to the second flange by means of the connection between the two flanges, and from the second flange to the driven shaft end by means of their mating bearing surfaces.

The connection between the flanges may be of any convenient character which will permit detachment, such as bolts, the flanges being attached together face to face so that when the bolts are removed the shaft ends and their flanges may be moved into and out of alined position without requiring their endwise movement.

Figure 1:
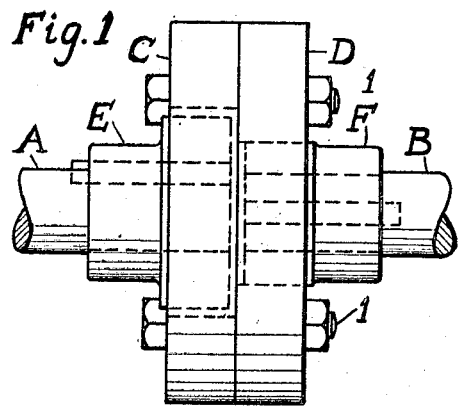
Figure 2:
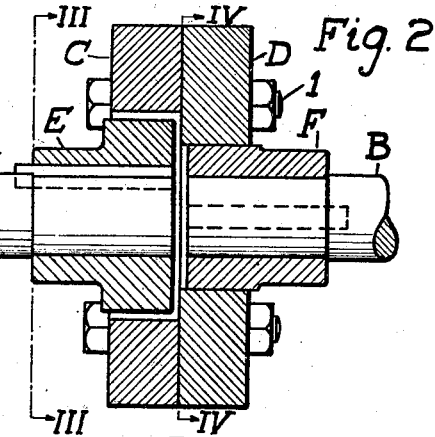
Figure 3:
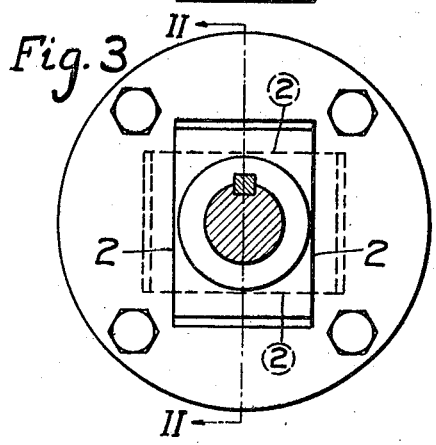
Figure 4:
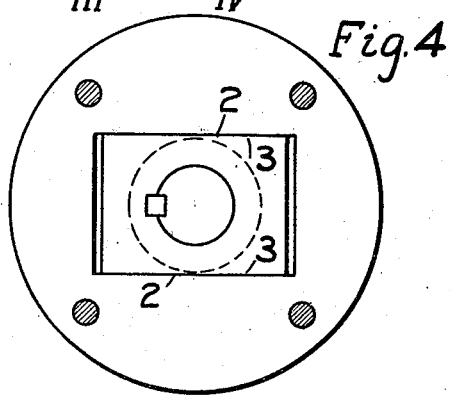
Figure 5:
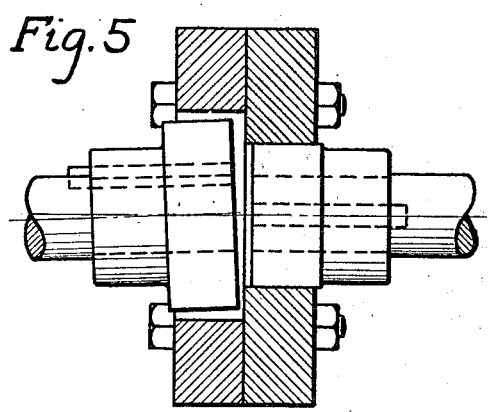
Figures 6, 7:
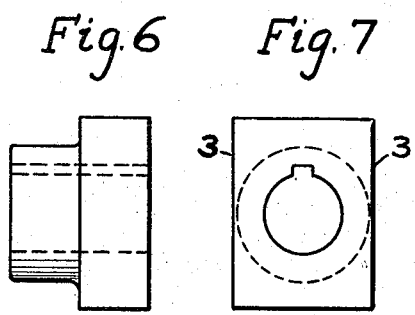

In the accompanying drawings, which are however merely intended to illustrate a practical embodiment of the principles of my invention without limiting the scope of the latter to the construction shown, Fig. 1 is a side elevation showing my coupling connecting together two shaft ends; Fig. 2 is a sectional view of the coupling taken along the line II—II in Fig. 3; Fig. 3 is an end view looking toward the right in Figures 1 and 2, the shaft end being sectioned along the line III—III in Fig. 2; Fig. 4 is a sectional view of the coupling taken along the line IV—IV in Fig. 2; Fig. 5 is a view similar to Fig. 2 but showing angular misalinement; Fig. 6 is a side elevation of one of the hubs, and Fig. 7 is an end elevation of the same.

The following is a detailed description of the drawings:

A and B represent, respectively, two shaft ends which are to be flexibly connected. C and D represent a pair of loose flanges which are detachably connected together face to face by the bolts 1, which extend through registering holes in the flanges.

Each of said flanges is provided with a diametrically disposed opening extending through the same and each having parallel side walls 2 which form bearing surfaces. When the flanges are connected together the bearing surfaces of one flange are disposed at right angles to those of the other flange.

The shaft ends are provided with bearing surfaces which mate with the bearing surfaces 2 of the flanges.

While the bearing surfaces of the shaft ends may be directly on the same, I prefer to provide the shaft ends with hubs E and F, respectively, which may be rigidly keyed on the shaft ends, and which are each provided with a pair of opposed bearing surfaces 3. The hubs E and F are inserted into the openings of the flanges C and D, respectively, and their bearing surfaces 3 are mated in surface contact with the bearing surfaces 2.

The openings in the flanges are of sufficient length to permit the surfaces 3 to slide on the surfaces 2, thus providing for parallel misalinement of the shaft ends; and also to permit the bearing surfaces 3 to swivel on the bearing surfaces 2, thus providing for angular misalinement as illustrated in Fig. 5.

Sufficient space is also provided between the adjacent shaft ends, or their hubs, to permit of this swiveling movement, and also to permit relative axial movement of the shaft ends.

Thus parallel and angular misalinement, and relative axial movement of the shaft ends are all amply provided for.

The advantages of my improved flexible coupling are numerous. Among them may be mentioned the following:

No use is made of an elastic material, and the characteristic faults of the same, such as backlash over-working fits, are absent. My flexible coupling is simple in construcion, employing a relatively small number of parts since the flanges are duplicates of each other as are also the hubs except in case of differences of shaft-fits. This is a decided manufacturing advantage, and reduces the amount of labor and time required in assembling and disassembling.

After the flanges have been mounted on the corresponding shaft ends, the coupling may be assembled without requiring endwise movement of either shaft. Likewise, after the bolts or other connections have been removed, the coupling may be disassembled by a parallel movement of one of the shaft ends.

This is of great advantage, as frequently endwise movement of the shafts is difficult or impossible, owing to lack of clearance or the connection of the shafts to other elements which cannot be conveniently moved. For instance, the coupling may be used to connect a motor to a gear drive which does not permit sufficient endwise movement of either shaft to allow assembling except by parallel movement of the shafts.

Although, for the sake of clearness, I have described in detail the embodiment of the principles of my invention illustrated in the drawings, I do not wish to limit myself thereby, but claim broadly—

1. In combination with a pair of shaft ends each provided with a pair of parallel flat bearing surfaces, a pair of loose flanges each provided with a diametrically disposed opening having a pair of parallel flat bearing surfaces, one of said flanges being associated with each shaft end and the bearing surfaces of the shaft end mating in flat surface contact with the bearing surfaces of the flange, and said flanges being connected together with their bearing surfaces disposed at right angles to each other.

2. In combination with a pair of shaft ends each provided with a pair of flat parallel bearing surfaces, a pair of loose flanges each provided with a diametrically disposed opening having a pair of flat parallel bearing surfaces, one of said flanges being associated with each shaft end and the bearing surfaces of the shaft end mating in flat surface contact with the bearing surfaces of the flange, and said flanges being detachably connected together with their bearing surfaces disposed at right angles to each other.

3. In combination with a pair of shaft ends each provided with a pair of flat parallel bearing surfaces, a pair of loose flanges each provided with a diametrically disposed opening having a pair of flat parallel bearing surfaces, one of said flanges being associated with each shaft end and the bearing surfaces of the shaft end mating in flat surface contact with the bearing surfaces of the flange with clearance at the ends of the opening to permit both sliding and swiveling movement between the mating bearing surfaces to provide for parallel and angular misalinement and the flanges being connected together with their bearing surfaces disposed at right angles to each other.

4. In combination with a pair of shaft ends each provided with a pair of flat parallel bearing surfaces, a pair of loose flanges each provided with a diametrically disposed opening having a pair of flat parallel bearing surfaces, one of said flanges being associated with each shaft end and the bearing surfaces of the shaft end mating in flat surface contact with the bearing surfaces of the flange with clearance at the ends of the opening to permit both sliding and swiveling movement between the mating bearing surfaces to provide for parallel and angular misalinement, and the flanges being detachably connected together with their bearing surfaces disposed at right angles to each other.

5. In combination with a pair of shaft ends each provided with a pair of flat parallel bearing surfaces, a pair of loose flanges each provided with a diametrically disposed opening having a pair of flat parallel bearing surfaces, one of said flanges being associated with each shaft end and the bearing surfaces of the shaft end mating in flat surface contact with the bearing surfaces of the flange with clearance at the ends of the opening to permit both sliding and swiveling movement between the mating bearing surfaces and to provide for parallel and angular misalinement, the flanges being connected together with their bearing surfaces disposed at right angles to each other and with sufficient clearance between the shaft ends to permit their angular misalinement and axial movement relative to each other.

6. In combination with a pair of shaft ends each provided with a pair of flat parallel bearing surfaces, a pair of loose flanges each provided with a diametrically disposed opening having a pair of flat parallel bearing surfaces, one of said flanges being associated with each shaft end and the bearing surfaces of the shaft end mating in flat surface contact with the bearing surfaces of the flange with clearance at the ends of the opening to permit both sliding and swiveling movement between the mating surfaces to provide for parallel and angular misalinement, and the flanges being detachably connected together with their bearing surfaces disposed at right angles and with sufficient clearance between the shaft ends to permit their angular misalinement and axial movement relative to each other.

Signed at Pittsburgh, Pa., this 12th day of August, 1922.

ROBERT W. SCHUETTE.